United States Patent
Park et al.

(10) Patent No.: US 7,301,891 B2
(45) Date of Patent: Nov. 27, 2007

(54) APPARATUS AND METHOD FOR REDUCING PEAK-TO-AVERAGE POWER RATIO IN AN ORTHOGONAL FREQUENCY DIVISION MULTIPLEXING SYSTEM

(75) Inventors: Sung-Eun Park, Suwon-si (KR); Jae-Yoel Kim, Gunpo-si (KR); Dae-Kwon Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 836 days.

(21) Appl. No.: 10/776,364

(22) Filed: Feb. 11, 2004

(65) Prior Publication Data

US 2004/0160893 A1    Aug. 19, 2004

(30) Foreign Application Priority Data

Feb. 13, 2003    (KR) .................... 10-2003-0009141

(51) Int. Cl.
*H04J 11/00* (2006.01)
(52) U.S. Cl. .................................... 370/208; 370/343
(58) Field of Classification Search ................ 370/208, 370/210, 343, 344
See application file for complete search history.

(56) References Cited

U.S. PATENT DOCUMENTS 6,125,103 A * 9/2000 Bauml et al. ............... 370/203
2001/0022777 A1 * 9/2001 Bourget et al. ............. 370/210
2002/0150036 A1 * 10/2002 Weerackody ............... 370/208
2003/0067866 A1 * 4/2003 Jung .......................... 370/210
2003/0202460 A1 * 10/2003 Jung et al. .................. 370/208
2003/0227867 A1 * 12/2003 Xiong ........................ 370/210

* cited by examiner

*Primary Examiner*—Kwang Bin Yao
*Assistant Examiner*—Andrew Lai
(74) *Attorney, Agent, or Firm*—The Farrell Law Firm

(57) ABSTRACT

A transmitter apparatus and method for reducing PAPR in an OFDM system. The transmitter apparatus performs a masking process on an input signal block using a plurality of mask sequences in an OFDM system, and selects a specific sequence having a lowest PAPR among IFFT-processed results. The apparatus includes a single IFFT for performing an IFFT process on the received signal block, and generating an IFFT-processed sequence; a plurality of shift registers for storing individual bits of the IFFT-processed sequence, cyclically shifting them, and generating the cyclically-shifted bits; a plurality of multiplier groups for multiplying coefficients determined by corresponding mask sequences by the output bits of the shift registers; and a plurality of adders corresponding to the plurality of multiplier groups for adding the multiplied results of the multiplier groups, thereby reducing system complexity and production costs.

23 Claims, 4 Drawing Sheets

APPARATUS AND METHOD FOR REDUCING PEAK-TO-AVERAGE POWER RATIO IN AN ORTHOGONAL FREQUENCY DIVISION MULTIPLEXING SYSTEM

PRIORITY

This application claims priority to an application entitled "APPARATUS AND METHOD FOR REDUCING PEAK-TO-AVERAGE POWER RATIO IN ORTHOGONAL FREQUENCY DIVISION MULTIPLEXING SYSTEM", filed in the Korean Intellectual Property Office on Feb. 13, 2003, and assigned Ser. No. 2003-9141, the contents of which are hereby incorporated by reference.

BACKGROUND OF THE INVENTION

1. Field of the Invention

The present invention relates generally to an OFDM (Orthogonal Frequency Division Multiplexing) communication system, and more particularly to an apparatus and method for reducing system complexity using an SLM (Selected Mapping) scheme to reduce a PAPR (Peak-to-Average Power Ratio).

2. Description of the Related Art

Conventionally, an OFDM communication system has been defined as an effective digital signal transmission scheme for loading a desired signal to be transmitted on a plurality of sub-band frequencies having carriers that are orthogonal to each other, and transmitting the desired signal loaded on the sub-band frequencies, such that uses an available frequency band at maximum efficiency and can effectively cope with burst errors generable by a fading operation. The OFDM scheme enables a frequency-selective fading phenomenon to approximate a frequency non-selective channel from the viewpoint of individual sub-channels to easily compensate for a serious frequency-selective fading phenomenon using a simple frequency area single-tap equalizer. The OFDM scheme inserts a cyclic prefix that is longer than a length of a multi-path channel delay spread into neighbor symbol blocks to remove interblock interference and interchannel interference, and is appropriate for a high-speed data transmission scheme using an IFFT (Inverse Fast Fourier Transformer) and an FFT (Fast Fourier Transformer).

The sub-band signal used in the OFDM scheme is modulated by the IFFT so that an amplitude of the modulated signal proportional to the number of the sub-bands is displayed in the form of a Gaussian Distribution according to the Central Limit Theorem. Therefore, a transmission signal has disadvantages in that it encounters very high PAPR characteristics along with serious nonlinear distortion, which is worse than that of a single carrier transmission scheme due to nonlinear saturation characteristics of a high-power amplifier used for creating sufficient transmission power in wireless communication environments, resulting in limited performance of the OFDM scheme. Therefore, many developers have conducted intensive research into a variety of solutions for solving the aforementioned problems.

The SLM scheme is a representative solution for reducing the PAPR, which creates U information series independent from each other to indicate the same entry information bit, selects the lowest PAPR among the U information series, and transmits the selected lowest PAPR. The U information series multiply the entry information bit by U mask sequences each having a predetermined length of N, and generate the multiplied result. The SLM scheme abruptly increases the number of calculations needed for an optimum PAPR as the number U of phase series increases, whereas it can maintain a data transfer rate. The SLM scheme uses U IFFTs, which are parallel to each other, to prevent a transmission time from being delayed, resulting in increased complexity of a transmitter.

FIG. 1 is a block diagram illustrating a transmitter for use in an OFDM communication system for use with a conventional SLM scheme. Referring to FIG. 1, an information bit configured in the form of a binary signal is applied to a channel encoder 100 as an input signal. The channel encoder 100 encodes the received information bit to generate coded symbols, and the coded symbols are applied to a mapper 110. The mapper 110 maps the received coded symbols with a single signal contained in a signal constellation. The mapping-processed output signals generated from the mapper 110 collect N signals according to the input magnitude N of the IFFT 140, and form a single signal block. The signal block branches to U branches, and the branched result is applied to a plurality of multipliers 130, 132, and 134. A mask generator 120 generates U independent mask sequences $M_1, M_2, \ldots, M_u$ each having the length of N, and the U mask sequences $M_1, M_2, \ldots, M_u$ are transmitted to the multipliers 130, 132, and 134, respectively.

The multipliers 130, 132, and 134 adapt the signal block and the mask sequences $M_1, M_2, \ldots, M_u$, as their input signals, respectively. Therefore, the multipliers 130, 132, and 134 perform the multiplication of two input signals, i.e., the signal block and one of the mask sequences $M_1, M_2, \ldots, M_u$. The output signals of the multipliers 130, 132, and 134 are IFFT-processed by the IFFTs 140, 142, and 144, respectively, such that the IFFTs 140, 142, and 144 output signal sequences $S_1, S_2, \ldots, S_u$, respectively A selector 150 receives the signal sequences $S_1, S_2, \ldots, S_u$, calculates individual PAPRs of the received signal sequences $S_1, S_2, \ldots, S_u$, selects a single signal sequence having the lowest PAPR among the received signal sequences $S_1, S_2, \ldots, S_u$, and transmits the selected signal sequence as a transmission signal.

As described above, the SLM scheme selects a signal block having the lowest PAPR among U signal blocks generated by the same information bit, and transmits the selected signal block in such a way that it can effectively reduce the PAPR. The higher the number U of signal blocks, the lower the PAPR. However, as illustrated in FIG. 1, the SLM uses U parallel IFFTs to prevent a transmission time from being delayed. As a result, the higher the number U of signal blocks, the higher the complexity and cost of production of a transmitter system.

SUMMARY OF THE INVENTION

Therefore, the present invention has been designed in view of the above problems, and it is an object of the present invention to provide an apparatus and method for reducing system complexity and a cost of production of an OFDM communication system based on an SLM scheme.

It is another object of the present invention to provide an apparatus and method for reducing the number of IFFTs needed to reduce a PAPR in the OFDM communication system based on the SLM scheme.

It is yet another object of the present invention to provide an apparatus and method for reducing the PAPR by sharing a single IFFT in the OFDM communication system based on the SLM scheme.

In accordance with one aspect of the present invention, the above and other objects are accomplished by an SLM (Selected Mapping) apparatus for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, and selecting one signal sequence having the lowest PAPR (Peak-to-Average Power Ratio) among the converted signal sequences. The SLM apparatus comprises: a single IFFT (Inverse Fast Fourier Transformer) for receiving the signal block contained in the frequency domain, performing an Inverse Fast Fourier Transform process on the signals of the signal block, and generating a conversion sequence symbol having a plurality of samples; a shift register for storing the samples of the conversion sequence symbol generated from the IFFT, wherein the shift register contains a plurality of memories serially connected to each other to store individual samples and acts as a cyclic shift register for connecting an output terminal of the last memory among the memories to an input terminal of a first memory among the memories such that a first input sample among the samples is applied to the first memory when it is generated from the last memory; a plurality of multiplier groups each composed of multipliers, wherein the multipliers are each connected to output terminals of the memories, receive a plurality of mask coefficient groups each composed of mask coefficients for generating a plurality of signal sequences containing a signal sequence having the lowest PAPR, and multiply output values of the plurality of memories by another received mask coefficient group among the received plurality of mask coefficient groups whenever the samples of the shift register are circulated; and a plurality of adder groups each having an adder for adding up output values of the multipliers contained in each multiplier group.

In accordance with another aspect of the present invention, there is provided an SLM (Selected Mapping) method for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, and selecting one signal sequence having the lowest PAPR (Peak-to-Average Power Ratio) among the converted signal sequences. The SLM method comprises the steps of: a) receiving the signal block contained in the frequency domain, performing an Inverse Fast Fourier Transform (IFFT) process on the signals of the signal block, and generating a conversion sequence symbol having a plurality of samples; b) storing the samples of the IFFT-processed conversion sequence symbol in a shift register, wherein the shift register contains a plurality of memories serially connected to each other to store individual samples and acts as a cyclic shift register for connecting an output terminal of the last memory among the memories to an input terminal of a first memory among the memories such that a first input sample among the samples is applied to the first memory when it is generated from the last memory; c) connecting a plurality of multiplier groups each composed of multipliers to output terminals of the memories, controlling the multipliers to receive a plurality of mask coefficient groups each composed of mask coefficients for generating a plurality of signal sequences containing a signal sequence having the lowest PAPR, and controlling the multipliers to multiply output values of the plurality of memories by another received mask coefficient group among the received plurality of mask coefficient groups whenever the samples of the shift register are circulated; and d) adding up output values of the multipliers contained in each multiplier group.

In accordance with yet another aspect of the present invention, there is provided a transmitter apparatus for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, selecting one signal sequence having the lowest PAPR (Peak-to-Average Power Ratio) among the converted signal sequences, and transmitting the selected signal sequence. The transmitter apparatus comprises: a single IFFT (Inverse Fast Fourier Transformer) for receiving the signal block contained in the frequency domain, performing an Inverse Fast Fourier Transform process on the signals of the signal block, and generating a conversion sequence symbol having a plurality of samples; a mask operator for receiving a plurality of mask coefficient groups generating a plurality of signal sequences containing a signal sequence having the lowest PAPR, multiplying the plurality of samples by another received mask coefficient group among the received plurality of mask coefficient groups whenever the plurality of samples generated from the IFFT are circulated, and generating a plurality of masking-processed sequences; and a selector for selecting a specific sequence having the lowest PAPR among the masking-processed sequences generated from the mask operator, and transmitting the selected sequence.

In accordance with yet another aspect of the present invention, there is provided a data transmission method for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, selecting one signal sequence having the lowest PAPR (Peak-to-Average Power Ratio) among the converted signal sequences, and transmitting the selected signal sequence. The method comprises the steps of: a) receiving the signal block contained in the frequency domain, performing an Inverse Fast Fourier Transform (IFFT) process on the signals of the signal block, and generating a conversion sequence symbol having a plurality of samples; b) receiving a plurality of mask coefficient groups generating a plurality of signal sequences containing a signal sequence having the lowest PAPR, multiplying the plurality of samples by another received mask coefficient group among the plurality of received mask coefficient groups whenever the plurality of samples generated from the IFFT are circulated, and generating a plurality of masking-processed sequences; and c) selecting a specific sequence having the lowest PAPR among the masking-processed sequences of the step (b), and transmitting the selected sequence.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Figure 1:
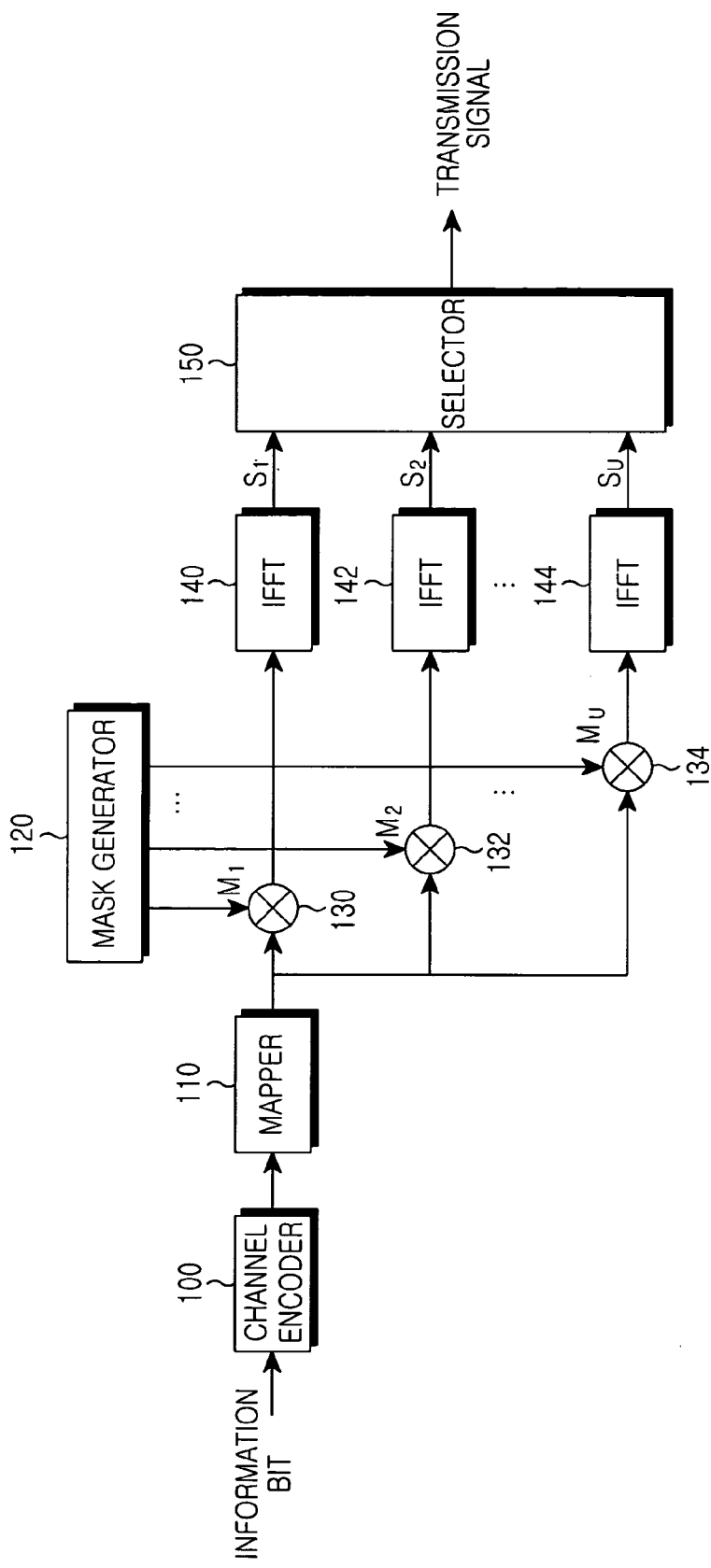
FIG. 1 is a block diagram illustrating a transmitter for use in a conventional OFDM communication system based on an SLM scheme.

Preferred embodiments of the present invention will be described in detail herein below with reference to the annexed drawings. In the drawings, the same or similar elements are denoted by the same reference numerals even though they are depicted in different drawings. Further, in the following description, a detailed description of known functions and configurations incorporated herein will be omitted when it may make the subject matter of the present invention rather unclear.

The present invention implements an SLM (Selected Mapping) scheme based on only one IFFT (Inverse Fast Fourier Transformer) using shift registers in the OFDM communication system, resulting in a reduced PAPR (Peal-to-Average Power Ratio).

Figure 2:
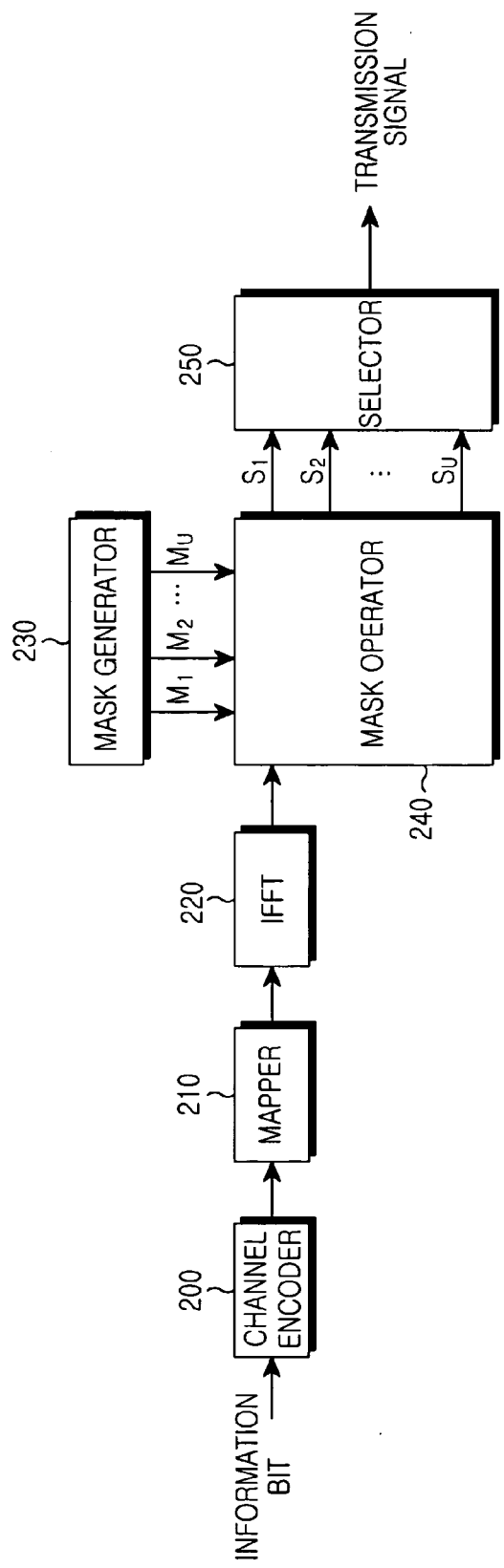
FIG. 2 is a block diagram illustrating a transmitter for use in an OFDM communication system in accordance with a preferred embodiment of the present invention.

FIG. 2 is a block diagram illustrating a transmitter for use in the OFDM communication system in accordance with a preferred embodiment of the present invention. Referring to FIG. 2, an information bit is configured in the form of a binary signal, and is applied to a channel encoder 200 as an input signal. The channel encoder 200 encodes the received information bit to generate coded symbols, which are applied to a mapper 210 as input signals. The mapper 210 maps the received coded symbols with a predetermined signal contained in a signal constellation. The mapping-processed output signals generated from the mapper 210 collect N signals according to the input magnitude N of the IFFT 220, and form a single signal block.

The IFFT 220 performs an IFFT (Inverse Fast Fourier Transform) operation upon receipt of the signal block, and transmits a sequence generated by the IFFT operation to the mask operator 240. In this case, each IFFT-processed output point of the IFFT 220 is called a sample. The sequence applied to the mask operator 240 is generated by converting parallel output samples of the IFFT 220 into serial samples.

The mask operator 240 receives information of U mask sequences $M_1, M_2, \ldots, M_u$ from the mask generator 230, performs a mask operation on the sequence received from the IFFT 220, and outputs signal sequences $S_1, S_2, \ldots, S_u$. The selector 250 receives the signal sequences $S_1, S_2, \ldots, S_u$ from the mask operator 240, calculates individual PAPRs of the received signal sequences $S_1, S_2, \ldots, S_u$, selects one having the lowest PAPR among the signal sequences $S_1, S_2, \ldots, S_u$, and transmits the selected signal sequence as a transmission signal.

The mask operator 240 contained in the aforementioned OFDM transmitter must be designed to enable the output signal sequences $S_1, S_2, \ldots, S_u$ to be equal to those of output signal sequences of the IFFTs 140, 142, and 144. Prior to describing detailed internal structure and operations of the mask operator 240, a mask operation of the multiplier 130 of FIG. 1 and operations of the IFFT 140 of FIG. 1 will be described using matrix and vector concepts.

Referring to FIG. 1, a signal block X of the output magnitude N of the mapper 110 is represented by the following Equation 1:

$$X = (x_0, x_1, x_2, x_3, \ldots, x_{N-1})^T \quad \text{[Equation 1]}$$

where, $A^T$ is a transpose matrix.

An i-th mask sequence $M_i$ generated from the mask generator 120, which is multiplied by the signal block X, is represented by the following Equation 2 configured in the form of a diagonal matrix:

$$M_i = \begin{bmatrix} m_{i,0} & 0 & 0 & 0 & \ldots & 0 \\ 0 & m_{i,1} & 0 & 0 & \ldots & 0 \\ 0 & 0 & m_{i,2} & 0 & \ldots & 0 \\ 0 & 0 & 0 & m_{i,3} & \ldots & 0 \\ \vdots & \vdots & \vdots & \vdots & \ddots & \vdots \\ 0 & 0 & 0 & 0 & \ldots & m_{i,N-1} \end{bmatrix} \quad \text{[Equation 2]}$$

When using a predetermined condition of $W = e^{j(2\pi/N)}$ according to Fourier Transform techniques well known in the art of communication technology, an IFFT matrix $Q^{-1}$ and an FFT matrix $Q$ can be represented by the following Equation 3:

$$Q^{-1} = \frac{1}{N}\begin{bmatrix} W^{0 \cdot 0} & W^{0 \cdot 1} & W^{0 \cdot 2} & W^{0 \cdot 3} & \ldots & W^{0 \cdot (N-1)} \\ W^{1 \cdot 0} & W^{1 \cdot 1} & W^{1 \cdot 2} & W^{1 \cdot 3} & \ldots & W^{1 \cdot (N-1)} \\ W^{2 \cdot 0} & W^{2 \cdot 1} & W^{2 \cdot 2} & W^{2 \cdot 3} & \ldots & W^{2 \cdot (N-1)} \\ W^{3 \cdot 0} & W^{3 \cdot 1} & W^{3 \cdot 2} & W^{3 \cdot 3} & \ldots & W^{3 \cdot (N-1)} \\ \vdots & \vdots & \vdots & \vdots & \ddots & \vdots \\ W^{(N-1) \cdot 0} & W^{(N-1) \cdot 1} & W^{(N-1) \cdot 2} & W^{(N-1) \cdot 3} & \ldots & W^{(N-1) \cdot (N-1)} \end{bmatrix}$$

$$Q = \begin{bmatrix} W^{-0 \cdot 0} & W^{-0 \cdot 1} & W^{-0 \cdot 2} & W^{-0 \cdot 3} & \ldots & W^{-0 \cdot (N-1)} \\ W^{-1 \cdot 0} & W^{-1 \cdot 1} & W^{-1 \cdot 2} & W^{-1 \cdot 3} & \ldots & W^{-1 \cdot (N-1)} \\ W^{-2 \cdot 0} & W^{-2 \cdot 1} & W^{-2 \cdot 2} & W^{-2 \cdot 3} & \ldots & W^{-2 \cdot (N-1)} \\ W^{-3 \cdot 0} & W^{-3 \cdot 1} & W^{-3 \cdot 2} & W^{-3 \cdot 3} & \ldots & W^{-3 \cdot (N-1)} \\ \vdots & \vdots & \vdots & \vdots & \ddots & \vdots \\ W^{-(N-1) \cdot 0} & W^{-(N-1) \cdot 1} & W^{-(-N-1) \cdot 2} & W^{-(N-1) \cdot 3} & \ldots & W^{-(N-1) \cdot (N-1)} \end{bmatrix}$$

[Equation 3]

Therefore, the i-th IFFT's output signal sequence $S_i = [s_0\ s_1\ s_2\ s_3\ \ldots\ s_{N-1}]^T$ generated by the i-th mask sequence Mi is represented by the following Equation 4:

$$S_i = Q^{-1} \cdot M_i \cdot X \quad \text{[Equation 4]}$$

For the convenience of description, the subscript 'i' will herein be omitted and the sequences are denoted by M and S in the present invention, so that the Equation 4 will also be represented by the following Equation 5:

$$S = Q^{-1} \cdot M \cdot X \quad \text{[Equation 5]}$$
$$= Q^{-1} \cdot M \cdot (Q \cdot Q^{-1}) \cdot X$$
$$= (Q^{-1} \cdot M \cdot Q) \cdot Q^{-1} \cdot X$$

In order to acquire the matrix $(Q^{-1} \cdot M \cdot Q)$ shown in Equation 5, two vectors $W_p$ and m can be represented by Equation 6:

$$W_p \equiv (W^{p \cdot 0}, W^{p \cdot 1}, W^{p \cdot 2}, W^{p \cdot 3}, \ldots, W^{p \cdot (N-1)})$$

$$m \equiv (m_0, m_1, m_2, m_3, \ldots, m_{N-1}) \quad \text{[Equation 6]}$$

The product $x \cdot y$ of every element of two vectors $(W_p, m)$ and its inner or dot product $\langle x, y \rangle$ are represented by Equation 7:

$$x \cdot y \equiv (x_0 \cdot y_0, x_1 \cdot y_1, x_2 \cdot y_2, x_3 \cdot y_3, \ldots, x_{N-1} \cdot y_{N-1}) \quad \text{[Equation 7]}$$

$$\langle x, y \rangle \equiv \sum_{n=0}^{N-1} x_n \cdot y_n$$

Therefore, the aforementioned definition of Equation 7 can also be represented by Equation 8:

$$W_p \cdot W_q = (W^{p \cdot 0}, W^{p \cdot 1}, W^{p \cdot 2}, \ldots, W^{p \cdot (N-1)}) \cdot \quad \text{[Equation 8]}$$

-continued $$(W^{q \cdot 0}, W^{q \cdot 1}, W^{q \cdot 2}, \ldots, W^{q \cdot (N-1)})$$

$$= (W^{p \cdot 0} \cdot W^{q \cdot 0}, W^{p \cdot 1} \cdot W^{q \cdot 1}, W^{p \cdot 2} \cdot W^{q \cdot 2}, \ldots, W^{(p+q)(N-1)} \cdot W^{q \cdot (N-1)})$$

$$= (W^{(p+q) \cdot 0}, W^{(p+q) \cdot 1}, W^{(p+q) \cdot 2}, \ldots, W^{(p+q)(N-1)})$$

$$= W_{(p+q)}$$

$$\langle x \cdot z, y \rangle = \sum_{n=0}^{N-1} (x_n \cdot z_n) \cdot y_n$$

$$= \sum_{n=0}^{N-1} x_n \cdot (z_n \cdot y_n)$$

$$= \langle x, z \cdot y \rangle$$

In the case of defining the matrix C using the above defined concepts under a predetermined condition $C = Q^{-1} \cdot M \cdot Q$, the matrix C can be represented by Equation 9 below.

$$C = Q^{-1} \cdot M \cdot Q \quad \text{[Equation 9]}$$

$$= \frac{1}{N} \begin{bmatrix} W_0 \\ W_1 \\ W_2 \\ W_3 \\ \vdots \\ W_{(N-1)} \end{bmatrix} \cdot \begin{bmatrix} m_0 & 0 & 0 & 0 & \ldots & 0 \\ 0 & m_1 & 0 & 0 & \ldots & 0 \\ 0 & 0 & m_2 & 0 & \ldots & 0 \\ 0 & 0 & 0 & m_3 & \ldots & 0 \\ \vdots & \vdots & \vdots & \vdots & \ddots & \vdots \\ 0 & 0 & 0 & 0 & \ldots & m_{N-1} \end{bmatrix} \cdot \begin{bmatrix} W_0^T & W_{-1}^T & W_{-2}^T & W_{-3}^T & \ldots & W_{-(N-1)}^T \end{bmatrix}$$

$$= \frac{1}{N} \begin{bmatrix} m \cdot W_0 \\ m \cdot W_1 \\ m \cdot W_2 \\ m \cdot W_3 \\ \vdots \\ m \cdot W_{(N-1)} \end{bmatrix} \cdot \begin{bmatrix} W_0^T & W_{-1}^T & W_{-2}^T & W_{-3}^T & \ldots & W_{-(N-1)}^T \end{bmatrix}$$

$$= \frac{1}{N} \begin{bmatrix} \langle m \cdot W_0, W_0 \rangle & \langle m \cdot W_0, W_{-1} \rangle & \langle m \cdot W_0, W_{-2} \rangle & \ldots & \langle m \cdot W_0, W_{-(N-1)} \rangle \\ \langle m \cdot W_1, W_0 \rangle & \langle m \cdot W_1, W_{-1} \rangle & \langle m \cdot W_1, W_{-2} \rangle & \ldots & \langle m \cdot W_1, W_{-(N-1)} \rangle \\ \langle m \cdot W_2, W_0 \rangle & \langle m \cdot W_2, W_{-1} \rangle & \langle m \cdot W_2, W_{-2} \rangle & \ldots & \langle m \cdot W_2, W_{-(N-1)} \rangle \\ \vdots & \vdots & \vdots & \ddots & \vdots \\ \langle m \cdot W_{(N-1)}, W_0 \rangle & \langle m \cdot W_{(N-1)}, W_{-1} \rangle & \langle m \cdot W_{(N-1)}, W_{-2} \rangle & \ldots & \langle m \cdot W_{(N-1)}, W_{-(N-1)} \rangle \end{bmatrix}$$

$$= \frac{1}{N} \begin{bmatrix} \langle m, W_0 \cdot W_0 \rangle & \langle m, W_0 \cdot W_{-1} \rangle & \langle m, W_0 \cdot W_{-2} \rangle & \ldots & \langle m, W_0 \cdot W_{-(N-1)} \rangle \\ \langle m, W_1 \cdot W_0 \rangle & \langle m, W_1 \cdot W_{-1} \rangle & \langle m, W_1 \cdot W_{-2} \rangle & \ldots & \langle m, W_1 \cdot W_{-(N-1)} \rangle \\ \langle m, W_2 \cdot W_0 \rangle & \langle m, W_2 \cdot W_{-1} \rangle & \langle m, W_2 \cdot W_{-2} \rangle & \ldots & \langle m, W_2 \cdot W_{-(N-1)} \rangle \\ \vdots & \vdots & \vdots & \ddots & \vdots \\ \langle m, W_{(N-1)} \cdot W_0 \rangle & \langle m, W_{(N-1)} \cdot W_{-1} \rangle & \langle m, W_{(N-1)} \cdot W_{-2} \rangle & \ldots & \langle m, W_{(N-1)} \cdot W_{-(N-1)} \rangle \end{bmatrix}$$

$$= \frac{1}{N} \begin{bmatrix} \langle m, W_0 \rangle & \langle m, W_{-1} \rangle & \langle m, W_{-2} \rangle & \ldots & \langle m, W_{-(N-1)} \rangle \\ \langle m, W_1 \rangle & \langle m, W_0 \rangle & \langle m, W_{-1} \rangle & \ldots & \langle m, W_{-(N-2)} \rangle \\ \langle m, W_2 \rangle & \langle m, W_1 \rangle & \langle m, W_0 \rangle & \ldots & \langle m, W_{-(N-3)} \rangle \\ \vdots & \vdots & \vdots & \ddots & \vdots \\ \langle m, W_{(N-1)} \rangle & \langle m, W_{(N-2)} \rangle & \langle m, W_{(N-3)} \rangle & \ldots & \langle m, W_0 \rangle \end{bmatrix}$$

$$= \frac{1}{N} \begin{bmatrix} <m, W_0> & <m, W_{(N-1)}> & <m, W_{(N-2)}> & \ldots & <m, W_1> \\ <m, W_1> & <m, W_0> & <m, W_{(N-1)}> & \ldots & <m, W_2> \\ <m, W_2> & <m, W_1> & <m, W_0> & \ldots & <m, W_3> \\ \vdots & \vdots & \vdots & \ddots & \vdots \\ <m, W_{(N-1)}> & <m, W_{(N-2)}> & <m, W_{(N-3)}> & \ldots & <m, W_0> \end{bmatrix}$$

When using a predetermined condition $$c_i = \frac{1}{N}<m, W_i>,$$

the matrix C can be configured in the form of cyclic series as shown in Equation 10:

$$C = \begin{bmatrix} c_0 & c_{N-1} & c_{N-2} & c_{N-3} & c_{N-4} & \ldots & c_1 \\ c_1 & c_0 & c_{N-1} & c_{N-2} & c_{N-3} & \ldots & c_2 \\ c_2 & c_1 & c_0 & c_{N-1} & c_{N-2} & \ldots & c_3 \\ c_3 & c_2 & c_1 & c_0 & c_{n-1} & \ldots & c_4 \\ c_4 & c_3 & c_2 & c_1 & c_0 & \ldots & c_5 \\ \vdots & \vdots & \vdots & \vdots & \vdots & \ddots & \vdots \\ c_{N-1} & c_{N-2} & c_{N-3} & c_{N-4} & c_{N-5} & \ldots & c_0 \end{bmatrix}$$ [Equation 10]

To summarize the above-described operation procedures, the operation procedures can also be represented as Equation 11:

$$S = Q^{-1} \cdot M \cdot X = C \cdot Q^{-1} \cdot X$$ [Equation 11]

Based on Equation 11 above, the mask operation to be executed by the mask operator 240 illustrated in FIG. 2 is defined as the matrix C. More specifically, the result of a predetermined operation, where the signal block X is multiplied by the mask sequence M and then passes through the IFFT $Q^{-1}$, of the transmitter illustrated FIG. 1 is equal to that of a predetermined operation, where the signal block X passes through the IFFT 220 $Q^{-1}$ and then the mask operator 240 performs a mask operation denoted by the matrix C, of the transmitter illustrated in FIG. 2. The matrix C will hereinafter be called a mask operation matrix.

The mask sequences $M_1, M_2, \ldots, M_u$ generated from the mask generator 230 are pre-engaged between the transmitter and the receiver, and remain unchanged after the lapse of a communication initialization time, so that N coefficients $C_0, C_1, \ldots, C_{N-1}$ needed for the mask operation of the mask operator 240 are determined by only one operation at the communication initialization time according to the mask sequences $M_1, M_2, \ldots, M_u$, and need not perform additional operations while communicating with other devices. More specifically, the n-th coefficient $C_n$ is determined by Equation 12:

$$c_n = \frac{1}{N}<m, W_n> = \frac{1}{N}\sum_{i=0}^{N-1} m_i \cdot e^{j(2\pi/N) \cdot i \cdot n}$$ [Equation 12]

Figure 3:
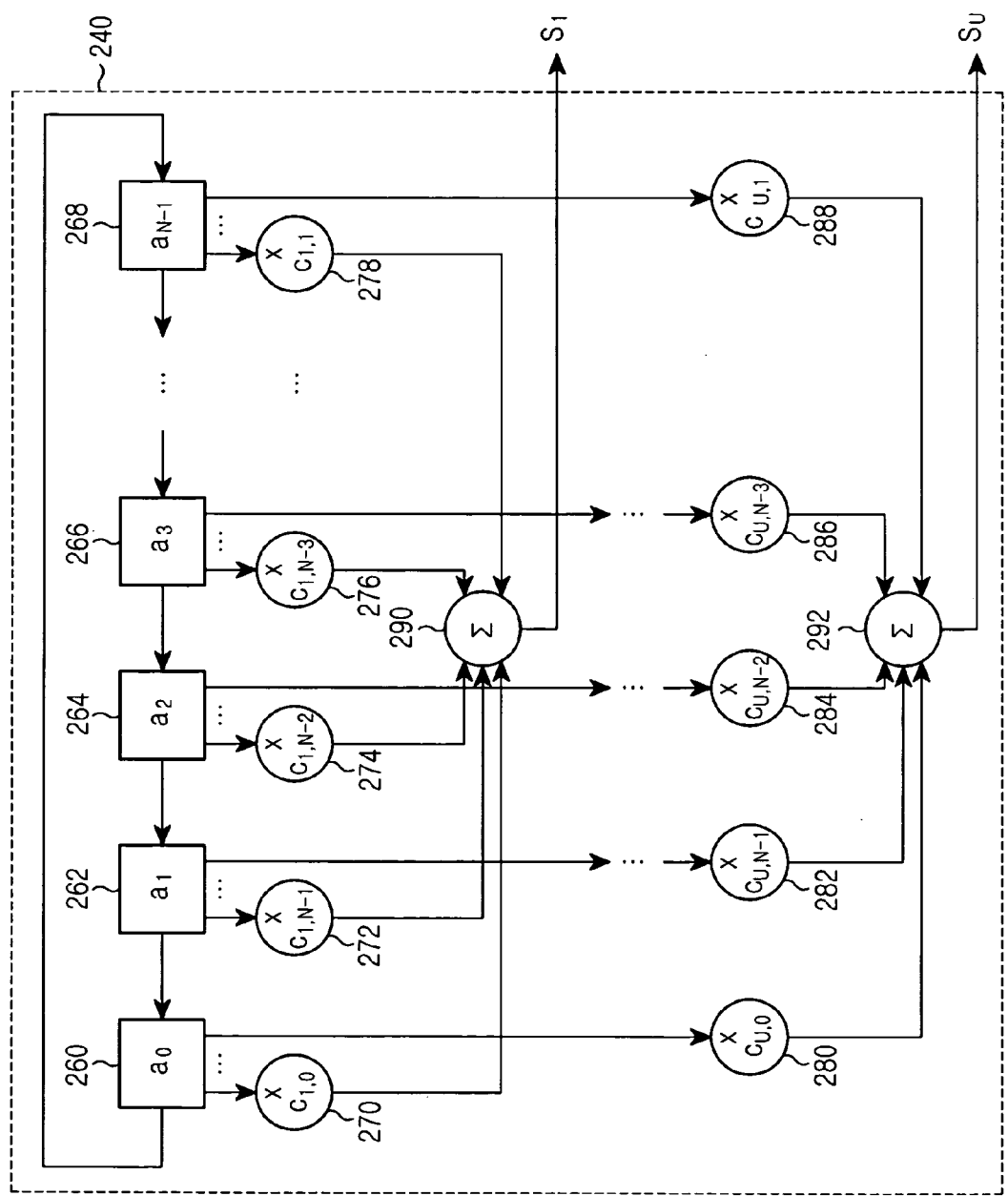
FIG. 3 is a detailed block diagram illustrating a mask operator illustrated in FIG. 2 in accordance with a preferred embodiment of the present invention.

Because the mask operation matrix C is a cyclic matrix, the mask operator 240 can be configured in the form of a simple structure using shift registers determined by elements of the first row of the mask operation matrix C. FIG. 3 is a detailed block diagram illustrating the mask operator 240 illustrated in FIG. 2 in accordance with a preferred embodiment of the present invention. Internal components and operations will hereinafter be described with reference to FIG. 3.

Referring to FIG. 3, the mask operator 240 includes a shift register group including N shift registers 260, 262, 264, 266, and 268 for storing individual bits of an input sequence having a predetermined size of N, U groups of multipliers, each including N multipliers 270, 272, 274, 276, 278, and N multipliers 280, 282, 284, 286, 288 in order to perform U mask operations, and U adders 290 and 292 to perform U mask operations.

Provided that a predetermined sequence generated by allowing an output signal block $X = (x_0, x_1, x_2, x_3, \ldots, x_{N-1})^T$ of the mapper 210 to pass through the IFFT 220 is set to 'A', 'A' can be represented by Equation 13:

$$A = Q^{-1}X = (a_0, a_1, a_2, a_3, \ldots, a_{N-1})^T$$ [Equation 13]

The shift registers 260, 262, 264, 266, and 268 are initialized to individual bits $a_0, a_1, a_2, a_3, \ldots, a_{N-1}$ of the input sequence A. In this case, provided that the output sequence of the mask operator 240 for the mask sequence $M_1$ is denoted by $S_1 = (s_{1,0}, s_{1,1}, s_{1,2}, S_{1,3}, \ldots, S_{1,N-1})^T$, a matrix representation of the mask operator 240 for the mask sequence $M_1$ in association with individual input values can be represented by Equation 14:

$$C_1 = Q^{-1}M_1Q$$ [Equation 14]

The multipliers 270, 272, 274, 276, and 278 multiply first row values $c_{1,0}, c_{1,N-1}, c_{1,N-2}, c_{1,N-3}, \ldots, c_{1,1}$ of the matrix $C_1$ by output values of the shift registers 260, 262, 264, 266, and 268, respectively. The mask operator 240 is operated with N stages associated with one input sequence A.

$S_1$ generation operations of the first, multiplier group and the first adder 290 for use in the mask operator 240 will hereinafter be described.

The multiplier 270 multiplies the output value $a_0$ of the shift register 260 by $c_{1,0}$, and the multiplied result is transmitted to the adder 290. The multiplier 272 multiplies the output value $a_1$ of the shift register 262 by $c_{1,N-1}$, and the multiplied result is transmitted to the adder 290. The multiplier 274 multiplies the output value $a_2$ of the shift register 264 by $c_{1,N-2}$, and the multiplied result is transmitted to the adder 290. The multiplier 276 multiplies the output value $a_3$ of the shift register 266 by $c_{1,N-3}$, and the multiplied result is transmitted to the adder 290. Similarly, the last multiplier 278 multiplies the output value $a_{N-1}$ of the last shift register 268 by $c_{1,1}$, and the multiplied result is transmitted to the adder 290.

The adder 290 adds up the multiplied results of the first multiplier group, and outputs the added result as the first element $S_{1,0}$ of the output sequence $S_1$. The first element $S_{1,0}$ can be represented by the following Equation 15:

$$S_{1,0} = a_0 \cdot c_{1,0} + a_1 \cdot c_{1,N-1} + a_2 \cdot c_{1,N-2} + a_3 \cdot c_{1,N-3} + \ldots + a_{N-1} \cdot c_{1,1}$$ [Equation 15]

Subsequently, values stored in the shift register group 294 are shifted to the left at the same time so that the shift registers 260, 262, 264, 266, and 268 contain values $a_1$, $a_2$, $a_3$, . . . , $a_{N-1}$, $a_0$, respectively.

Next, the multiplier 270 multiplies the output value $a_1$ of the shift register 260 by $c_{1,0}$, and the multiplied result is transmitted to the adder 290. The multiplier 272 multiplies the output value $a_2$ of the shift register 262 by $c_{1,N-1}$, and the multiplied result is transmitted to the adder 290. The multiplier 274 multiplies the output value $a_3$ of the shift register 264 by $c_{1,N-2}$, and the multiplied result is transmitted to the adder 290. The multiplier 276 multiplies the output value $a_4$ of the shift register 266 by $c_{1,N-3}$, and the multiplied result is transmitted to the adder 290. Similarly, the last multiplier 278 multiplies the output value $a_0$ of the last shift register 268 by $c_{1,1}$, and the multiplied result is transmitted to the adder 290.

The adder 290 adds up the multiplied results of the first multiplier group, and outputs the added result as the second element $s_{1,1}$ of the output sequence $S_1$. The second element $s_{1,1}$ can be represented by the following Equation 16:

$$s_{1,1} = a_1 \cdot c_{1,0} + a_2 \cdot c_{1,N-1} + a_3 \cdot c_{1,N-2} + a_4 \cdot c_{1,N-3} + \cdots + a_0 \cdot c_{1,1} \quad \text{[Equation 16]}$$

The above-described operations of the shift register group, i.e., the first multiplier group, and the first adder 290 are repeated N times so that the values of the shift register group are completely circulated. In the case of the last shift operation, the shift registers 260, 262, 264, 266, and 268 of the shift register group 240 contain values $a_{N-1}$, $a_0$, $a_1$, $a_2$, . . . , $a_{N-2}$, respectively.

Accordingly, the multiplier 270 multiplies the output value $a_{N-1}$ of the shift register 260 by $c_{1,0}$, and the multiplied result is transmitted to the adder 290. The multiplier 272 multiplies the output value $a_0$ of the shift register 262 by $c_{1,N-1}$, and the multiplied result is transmitted to the adder 290. The multiplier 274 multiplies the output value $a_1$ of the shift register 264 by $c_{1,N-2}$, and the multiplied result is transmitted to the adder 290. The multiplier 276 multiplies the output value $a_2$ of the shift register 266 by $c_{1,N-3}$, and the multiplied result is transmitted to the adder 290. Further, the last multiplier 278 multiplies the output value $a_{N-2}$ of the last shift register 268 by $c_{1,1}$, and the multiplied result is transmitted to the adder 290.

The adder 290 adds up the multiplied results of the first multiplier group, and outputs the added result as the N-th element $s_{1,N-1}$ of the output sequence $S_1$. The N-th element $s_{1,N-1}$ can be represented by Equation 17:

$$s_{1,N-1} = a_{N-1} \cdot c_{1,0} + a_0 \cdot c_{1,N-1} + a_1 \cdot c_{1,N-2} + a_2 \cdot c_{1,N-3} + \cdots + a_{N-2} \cdot c_{1,1} \quad \text{[Equation 17]}$$

As a result, the adder 290 can output all the N elements of the output signal sequence $S_1$.

The above-described operations for acquiring the output signal sequence $S_1$ using the mask sequence $M_1$ can equally be applied to the process for acquiring the output signal sequences $S_2$, $S_3$, . . . , $S_u$ using the U-1 mask sequences $M_2$, $M_3$, . . . , $M_u$.

Operations for acquiring the last output sequence $S_u$ in association with the last mask sequence $M_u$ will hereinafter be described. In this case, the last output sequence $S_u$ can be represented by Equation 18:

$$S_U = (S_{U,0}, S_{U,1}, S_{U,2}, S_{U,3}, \ldots, S_{U,N-1})^T \quad \text{[Equation 18]}$$

A plurality of multipliers 280, 282, 284, 286, and 288 for use in the last multiplier group multiply the first row values $C_{U,0}$, $C_{U,N-1}$, $C_{U,N-2}$, $C_{U,N-3}$, . . . , $C_{U,1}$ of the mask operation matrix $C_U = Q^{-1} M_U Q$ for the last mask sequence $M_U$ by output values of the shift register group, respectively. Thereafter, if the shift operation, the multiplication operation, and the addition operation are each repeated N times, the last adder 292 finally outputs the output signal sequence $S_U$ having N elements.

Using the above-described operations, the mask operator 240 outputs desired output signal sequences $S_1$, $S_2$, $S_3$, . . . , $S_U$ parallel to each other.

Figure 4:
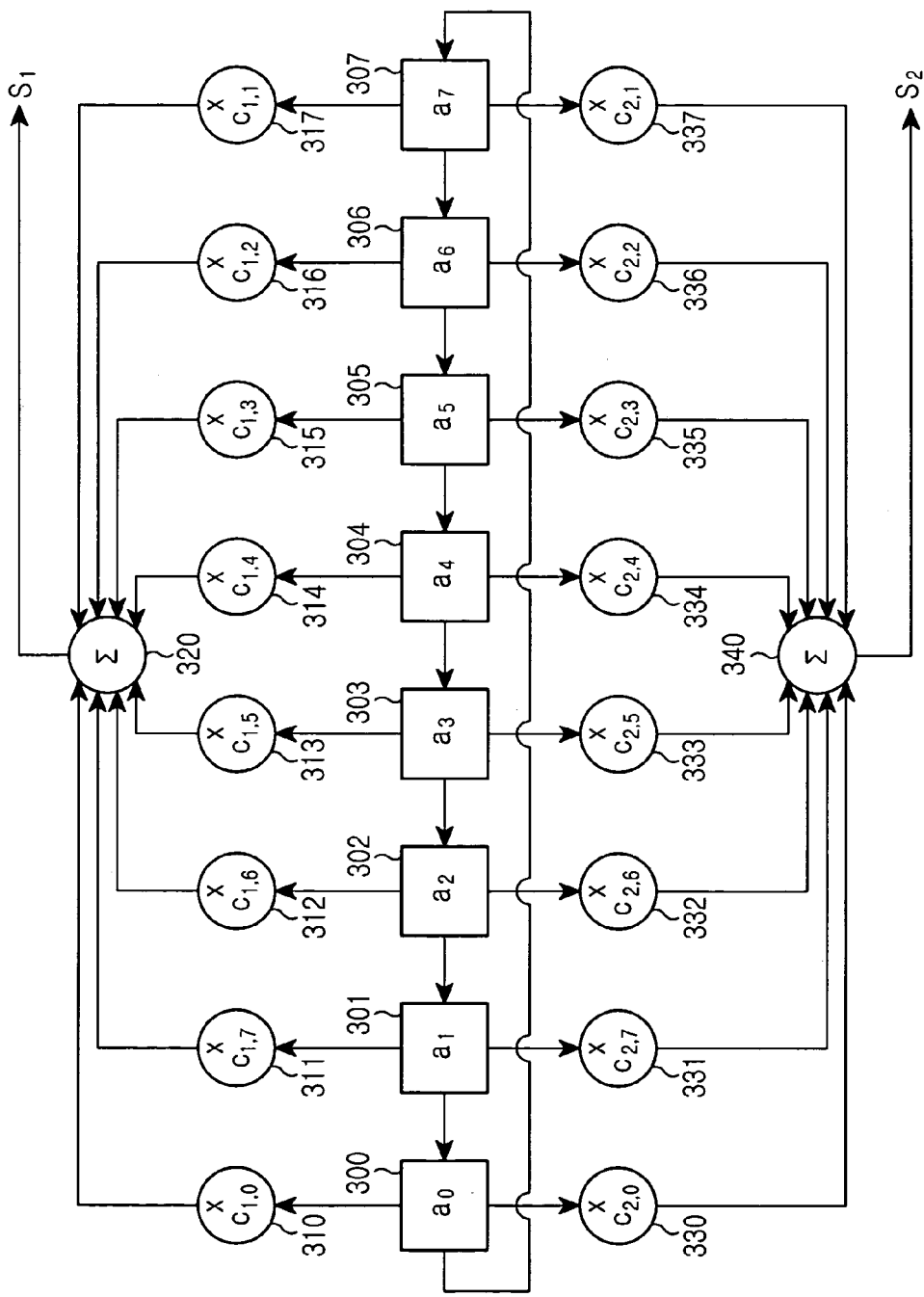
FIG. 4 is a detailed block diagram illustrating a mask operator for use in a specific case denoted by U=2 in accordance with a preferred embodiment of the present invention.

FIG. 4 is an exemplary block diagram illustrating the mask operator 240 using shift registers in accordance with a preferred embodiment of the present invention. More specifically, FIG. 4 illustrates a simple configuration for generating two output signal sequences in association with an input sequence composed of 8 bits. Further, it is assumed that a predetermined condition denoted by N=8 and U=2 is applied to FIG. 4. The mask generator 230 illustrated in FIG. 2 generates two mask sequences $M_1$ and $M_2$, and the mask operator 240 generates two output signal sequences $S_1$ and $S_2$ using the output sequence of the IFFT 220 and the mask sequences.

Referring to FIG. 4, the mask operator 240 includes eight shift registers 300, 301, 302, 303, 304, 305, 306, and 307, first multipliers 310, 311, 312, 313, 314, 315, 316, and 317 for the first output signal sequence $S_1$, second multipliers 330, 331, 332, 333, 334, 335, 336, and 337 for the second output signal sequence $S_2$, a first added 320 and a second adder 340.

The input sequence A of the mask operator 240 can be represented by Equation 19:

$$A = Q^{-1} X = (a_0, a_1, a_2, a_3, \ldots, a_7)^T \quad \text{[Equation 19]}$$

where X is an input signal of the IFFT 220.

The first multipliers 310-317 multiply individual input signals by the first row values $C_{1,0}$, $C_{1,7}$, $C_{1,6}$, $C_{1,5}$, . . . , $C_{1,1}$ of the mask operation matrix $C_1$ for the first mask sequence $M_1$, respectively. The first adder 320 adds up the multiplied results received from the first multipliers 310-317, and outputs the first output signal sequence $S_1$. The second multipliers 330-337 multiply individual input signals by the first row values $C_{2,0}$, $C_{2,7}$, $C_{2,6}$, $C_{2,5}$, . . . , $C_{2,1}$ of the mask operation matrix $C_2$ for the second mask sequence $M_2$, respectively. The second adder 340 adds up the multiplied results received from the second multipliers 330-337, and outputs the second output signal sequence $S_2$, so that the first and second output signal sequences $S_1$ and $S_2$ can be represented by the following Equation 20:

$$S_1 = (s_{1,0}, s_{1,1}, s_{1,2}, s_{1,3}, \ldots, s_{1,7})^T$$

$$S_2 = (s_{2,0}, s_{2,1}, s_{2,2}, s_{2,3}, \ldots, s_{2,7})^T \quad \text{[Equation 20]}$$

In more detail, the mask operator 240 repeats eight operations for one input sequence A.

The shift registers 300~307 are initialized to individual bits $a_0$, $a_1$, $a_2$, $a_3$, . . . , $a_7$, respectively The first multiplier 310 multiplies the output value $a_0$ of the shift register 300 by $c_{1,0}$, and the multiplied result is transmitted to the first adder 320. The first multiplier 311 multiplies the output value, $a_1$ of the shift register 301 by $c_{1,7}$, and the multiplied result is transmitted to the first adder 320. The first multiplier 312 multiplies the output value $a_2$ of the shift register 302 by $c_{1,6}$, and the multiplied result is transmitted to the first adder 320. The first multiplier 313 multiplies the output value $a_3$ of the shift register 303 by $c_{1,5}$, and the multiplied result is transmitted to the first adder 320. The first multiplier 314 multiplies the output value $a_4$ of the shift register 304 by $c_{1,4}$, and the multiplied result is transmitted to the first adder 320. The first multiplier 315 multiplies the output value $a_5$ of the shift register 305 by $c_{1,3}$, and the multiplied result is transmitted to the first adder 320. The first multiplier 316 multiplies the output value $a_6$ of the shift register 306 by $c_{1,2}$, and the multiplied result is transmitted to the first adder 320. The first multiplier 317 multiplies the output value $a_7$ of the shift register 307 by $c_{1,1}$, and the multiplied result is transmitted to the first adder 320.

The first adder 320 adds up the multiplied results of the first multipliers 310~317, and outputs the added result as the first element $s_{1,0}$ of the first output signal sequence $S_1$. The first element $s_{1,0}$ can be represented as follows:

$$s_{1,0} = a_0 \cdot c_{1,0} + a_1 \cdot c_{1,7} + a_2 \cdot c_{1,6} + a_3 \cdot c_{1,5} + \ldots + a_7 \cdot c_{1,1} \quad \text{[Equation 21]}$$

The second multiplier 330 multiplies the output value $a_0$ of the shift register 300 by $c_{2,0}$, and the multiplied result is transmitted to the second adder 340. The second multiplier 331 multiplies the output value $a_1$ of the shift register 301 by $c_{2,7}$, and the multiplied result is transmitted to the second adder 340. The second multiplier 332 multiplies the output value $a_2$ of the shift register 302 by $c_{2,6}$, and the multiplied result is transmitted to the second adder 340. The second multiplier 333 multiplies the output value $a_3$ of the shift register 303 by $c_{2,5}$, and the multiplied result is transmitted to the second adder 340. The second multiplier 334 multiplies the output value $a_4$ of the shift register 304 by $c_{2,4}$, and the multiplied result is transmitted to the second adder 340. The second multiplier 335 multiplies the output value $a_5$ of the shift register 305 by $c_{2,3}$, and the multiplied result is transmitted to the second adder 340. The second multiplier 336 multiplies the output value $a_6$ of the shift register 306 by $c_{2,2}$, and the multiplied result is transmitted to the second adder 340. The second multiplier 337 multiplies the output value $a_7$ of the shift register 307 by $c_{2,1}$, and the multiplied result is transmitted to the second adder 340.

The second adder 340 adds up the multiplied, results of the second multipliers 330~337, and outputs the added result as the first element $s_{2,0}$ of the second output signal sequence $S_2$. The first element $s_{2,0}$ can be represented by Equation 22:

$$s_{2,0} = a_0 \cdot c_{2,0} + a_1 \cdot c_{2,7} + a_2 \cdot c_{2,6} + a_3 \cdot c_{2,5} + \ldots + a_7 \cdot c_{2,1} \quad \text{[Equation 22]}$$

Subsequently, individual values stored in the shift registers 300~307 are shifted to the left at the same time so that the shift registers 300~307 contain values $a_1, a_2, a_3, \ldots, a_7, a_0$, respectively. The above-described multipliers and adders perform the above operations on the shifted values, resulting in the second elements $S_{1,1}$ and $S_{2,1}$ of the first and second output signal sequences $S_1$ and $S_2$.

For repeating the aforementioned operation 8 times, the last output signal sequences $S_1$ and $S_2$ can be represented by Equation 23:

$$S_1: s_{1,0} = a_0 \cdot c_{1,0} + a_1 \cdot c_{1,7} + a_2 \cdot c_{1,6} + a_3 \cdot c_{1,5} + a_4 \cdot c_{1,4} + a_5 \cdot c_{1,3} + a_6 \cdot c_{1,2} + a_7 \cdot c_{1,1} \; s_{1,1} = a_1 \cdot c_{1,0} + a_2 \cdot c_{1,7} + a_3 \cdot c_{1,6} + a_4 \cdot c_{1,5} + a_5 \cdot c_{1,4} + a_6 \cdot c_{1,3} + a_7 \cdot c_{1,2} + a_0 \cdot c_{1,1} \; s_{1,2} = a_2 \cdot c_{1,0} + a_3 \cdot c_{1,7} + a_4 \cdot c_{1,6} + a_5 \cdot c_{1,5} + a_6 \cdot c_{1,4} + a_7 \cdot c_{1,3} + a_0 \cdot c_{1,2} + a_1 \cdot c_{1,1} \; s_{1,3} = a_3 \cdot c_{1,0} + a_4 \cdot c_{1,7} + a_5 \cdot c_{1,6} + a_6 \cdot c_{1,5} + a_7 \cdot c_{1,4} + a_0 \cdot c_{1,3} + a_1 \cdot c_{1,2} + a_2 \cdot c_{1,1} \; s_{1,4} = a_4 \cdot c_{1,0} + a_5 \cdot c_{1,7} + a_6 \cdot c_{1,6} + a_7 \cdot c_{1,5} + a_0 \cdot c_{1,4} + a_1 \cdot c_{1,3} + a_2 \cdot c_{1,2} + a_3 \cdot c_{1,1} \; s_{1,5} = a_5 \cdot c_{1,0} + a_6 \cdot c_{1,7} + a_7 \cdot c_{1,6} + a_0 \cdot c_{1,5} + a_1 \cdot c_{1,4} + a_2 \cdot c_{1,3} + a_3 \cdot c_{1,2} + a_4 \cdot c_{1,1} \; s_{1,6} = a_6 \cdot c_{1,0} + a_7 \cdot c_{1,7} + a_0 \cdot c_{1,6} + a_1 \cdot c_{1,5} + a_2 \cdot c_{1,4} + a_3 \cdot c_{1,3} + a_4 \cdot c_{1,2} + a_5 \cdot c_{1,1} \; s_{1,7} = a_7 \cdot c_{1,0} + a_0 \cdot c_{1,7} + a_1 \cdot c_{1,6} + a_2 \cdot c_{1,5} + a_3 \cdot c_{1,4} + a_4 \cdot c_{1,3} + a_5 \cdot c_{1,2} + a_6 \cdot c_{1,1}$$

$$S_2: s_{2,0} = a_0 \cdot c_{2,0} + a_1 \cdot c_{2,7} + a_2 \cdot c_{2,6} + a_3 \cdot c_{2,5} + a_4 \cdot c_{2,4} + a_5 \cdot c_{2,3} + a_6 \cdot c_{2,2} + a_7 \cdot c_{2,1} \; s_{2,1} = a_1 \cdot c_{2,0} + a_2 \cdot c_{2,7} + a_3 \cdot c_{2,6} + a_4 \cdot c_{2,5} + a_5 \cdot c_{2,4} + a_6 \cdot c_{2,3} + a_7 \cdot c_{2,2} + a_0 \cdot c_{2,1} \; s_{2,2} = a_2 \cdot c_{2,0} + a_3 \cdot c_{2,7} + a_4 \cdot c_{2,6} + a_5 \cdot c_{2,5} + a_6 \cdot c_{2,4} + a_7 \cdot c_{2,3} + a_0 \cdot c_{2,2} + a_1 \cdot c_{2,1} \; s_{2,3} = a_3 \cdot c_{2,0} + a_4 \cdot c_{2,7} + a_5 \cdot c_{2,6} + a_6 \cdot c_{2,5} + a_7 \cdot c_{2,4} + a_0 \cdot c_{2,3} + a_1 \cdot c_{2,2} + a_2 \cdot c_{2,1} \; s_{2,4} = a_4 \cdot c_{2,0} + a_5 \cdot c_{2,7} + a_6 \cdot c_{2,6} + a_7 \cdot c_{2,5} + a_0 \cdot c_{2,4} + a_1 \cdot c_{2,3} + a_2 \cdot c_{2,2} + a_3 \cdot c_{2,1} \; s_{2,5} = a_5 \cdot c_{2,0} + a_6 \cdot c_{2,7} + a_7 \cdot c_{2,6} + a_0 \cdot c_{2,5} + a_1 \cdot c_{2,4} + a_2 \cdot c_{2,3} + a_3 \cdot c_{2,2} + a_4 \cdot c_{2,1} \; s_{2,6} = a_6 \cdot c_{2,0} + a_7 \cdot c_{2,7} + a_0 \cdot c_{2,6} + a_1 \cdot c_{2,5} + a_2 \cdot c_{2,4} + a_3 \cdot c_{2,3} + a_4 \cdot c_{2,2} + a_5 \cdot c_{2,1} \; s_{2,7} = a_7 \cdot c_{2,0} + a_0 \cdot c_{2,7} + a_1 \cdot c_{2,6} + a_2 \cdot c_{2,5} + a_3 \cdot c_{2,4} + a_4 \cdot c_{2,3} + a_5 \cdot c_{2,2} + a_6 \cdot c_{2,1}$$

Further, the first and second output signal sequences can be represented by Equation 24:

$$S_1 = (s_{1,0}, s_{1,1}, s_{1,2}, s_{1,3}, \ldots, s_{1,7})^T \quad \text{[Equation 24]}$$

$$= \begin{bmatrix} c_{1,0} c_{1,7} c_{1,6} c_{1,5} c_{1,4} c_{1,3} c_{1,2} c_{1,1} \\ c_{1,1} c_{1,0} c_{1,7} c_{1,6} c_{1,5} c_{1,4} c_{1,3} c_{1,2} \\ c_{1,2} c_{1,1} c_{1,0} c_{1,7} c_{1,6} c_{1,5} c_{1,4} c_{1,3} \\ c_{1,3} c_{1,2} c_{1,1} c_{1,0} c_{1,7} c_{1,6} c_{1,5} c_{1,4} \\ c_{1,4} c_{1,3} c_{1,2} c_{1,1} c_{1,0} c_{1,7} c_{1,6} c_{1,5} \\ c_{1,5} c_{1,4} c_{1,3} c_{1,2} c_{1,1} c_{1,0} c_{1,7} c_{1,6} \\ c_{1,6} c_{1,5} c_{1,4} c_{1,3} c_{1,2} c_{1,1} c_{1,0} c_{1,7} \\ c_{1,7} c_{1,6} c_{1,5} c_{1,4} c_{1,3} c_{1,2} c_{1,1} c_{1,0} \end{bmatrix} \cdot \begin{bmatrix} a_0 \\ a_1 \\ a_2 \\ a_3 \\ a_4 \\ a_5 \\ a_6 \\ a_7 \end{bmatrix}$$

$$S_1 = (s_{2,0}, s_{2,1}, s_{2,2}, s_{2,3}, \ldots, s_{2,7})^T$$

$$= \begin{bmatrix} c_{2,0} c_{2,7} c_{2,6} c_{2,5} c_{2,4} c_{2,3} c_{2,2} c_{2,1} \\ c_{2,1} c_{2,0} c_{2,7} c_{2,6} c_{2,5} c_{2,4} c_{2,3} c_{2,2} \\ c_{2,2} c_{2,1} c_{2,0} c_{2,7} c_{2,6} c_{2,5} c_{2,4} c_{2,3} \\ c_{2,3} c_{2,2} c_{2,1} c_{2,0} c_{2,7} c_{2,6} c_{2,5} c_{2,4} \\ c_{2,4} c_{2,3} c_{2,2} c_{2,1} c_{2,0} c_{2,7} c_{2,6} c_{2,5} \\ c_{2,5} c_{2,4} c_{2,3} c_{2,2} c_{2,1} c_{2,0} c_{2,7} c_{2,6} \\ c_{2,6} c_{2,5} c_{2,4} c_{2,3} c_{2,2} c_{2,1} c_{2,0} c_{2,7} \\ c_{2,7} c_{2,6} c_{2,5} c_{2,4} c_{2,3} c_{2,2} c_{2,1} c_{2,0} \end{bmatrix} \cdot \begin{bmatrix} a_0 \\ a_1 \\ a_2 \\ a_3 \\ a_4 \\ a_5 \\ a_6 \\ a_7 \end{bmatrix}$$

As is apparent from the description above, the present invention controls an OFDM communication system to share only one IFFT using shift registers, instead of using U IFFTs parallel to each other, to reduce a PAPR using an SLM scheme, resulting in reduction of complexity and cost of production of the OFDM transmitter system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An SLM (Selected Mapping) apparatus for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, and selecting a signal sequence having a lowest PAPR (Peak-to-Average Power Ratio) among the converted signal sequences, the SLM apparatus comprising:

a single IFFT (Inverse Fast Fourier Transformer) for performing an Inverse Fast Fourier Transform process on the plurality of signals of the signal block and generating a conversion sequence symbol having a plurality of samples;

a shift register for storing the plurality samples of the conversion sequence symbol generated from the IFFT, a plurality of multiplier groups each including a plurality of multipliers, and a plurality of adder groups each having an adder for adding up output values of the plurality of multipliers included in each of the plurality of multiplier groups;

wherein the shift register includes a plurality of memories serially connected to each other for storing individual samples and acts as a cyclic shift register for connecting an output terminal of a last memory among the memories to an input terminal of a first memory among the memories, such that a first input sample among the individual samples is applied to the first memory when it is generated from the last memory; and wherein the plurality of multipliers are each connected to output terminals of the plurality of memories, receive a plurality of mask coefficient groups, each including mask coefficients for generating a plurality of signal sequences containing a signal sequence having the lowest PAPR, and multiply output values of the plurality of memories by another received mask coefficient group among the received plurality of mask coefficient groups, whenever the individual samples of the shift register are circulated.

2. The apparatus as set forth in claim 1, further comprising:

a selector for selecting a specific signal sequence having a lowest PAPR among a plurality of signal sequences that are generated from the plurality of adder groups each having an adder for adding up output values of the plurality of multipliers.

3. The apparatus as set forth in claim 1, further comprising a mask generator for generating the plurality of mask coefficient groups.

4. The apparatus as set forth in claim 1, wherein the mask coefficients are determined by:

$$c_{p,q} = \frac{1}{N} \sum_{i=0}^{N-1} m_{p,i} \cdot e^{j(2\pi/N) \cdot i \cdot q}$$

where $c_{p,q}$ is a q-th coefficient of a mask operation matrix determined by a p-th mask sequence, N is a magnitude of the signal block, $m_{p,i}$ is an i-th bit of the p-th mask sequence, and e is a natural logarithm.

5. The apparatus as set forth in claim 1, wherein the plurality of multiplier groups share output terminals of the shift register.

6. An SLM (Selected Mapping) method for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, and selecting a signal sequence having a lowest PAPR (Peak-to-Average Power Ratio) among the converted signal sequences, the SLM method comprising the steps of:

a) performing an Inverse Fast Fourier Transform (IFFT) process on the plurality of signals included in the signal block, and generating a conversion sequence symbol having a plurality of samples;

b) storing the plurality of samples of the IFFT-processed conversion sequence symbol in a shift register, wherein the shift register includes a plurality of memories, which are serially connected to each other, for storing individual samples, and acts as a cyclic shift register for connecting an output terminal of a last memory among the plurality of memories to an input terminal of a first memory among the plurality of memories such that a first input sample among the plurality of samples is applied to the first memory whenever it is generated from the last memory;

c) connecting a plurality of multiplier groups, each including a plurality of multipliers, to output terminals of the plurality of memories;

d) receiving in the plurality of multipliers, a plurality of mask coefficient groups, each including mask coefficients, for generating a plurality of signal sequences containing a signal sequence having the lowest PAPR;

e) multiplying output values of the plurality of memories by another received mask coefficient group among the received plurality of mask coefficient groups, whenever the plurality of samples of the shift register are circulated; and f) adding up output values of the plurality of multipliers contained in each of the plurality of multiplier groups.

7. The method as set forth in claim 6, further comprising the step of:

g) selecting a specific signal sequence having the lowest PAPR among a plurality of signal sequences that are generated from the plurality of adder groups each having an adder for adding up output values of the plurality of multipliers.

8. The method as set forth in claim 6, wherein the plurality of mask coefficient groups are generated by a predetermined mask generator.

9. The method as set forth in claim 6, wherein the plurality of mask coefficients are determined by $$c_{p,q} = \frac{1}{N} \sum_{i=0}^{N-1} m_{p,i} \cdot e^{j(2\pi/N) \cdot i \cdot q}$$

where $c_{p,q}$ is a q-th coefficient of a mask operation matrix determined by a p-th mask sequence, N is a magnitude of the signal block, $m_{p,i}$ is an i-th bit of the p-th mask sequence, and e is a natural logarithm.

10. The method as set forth in claim 6, wherein the plurality of multiplier groups share output terminals of the shift register.

11. A transmitter apparatus for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, selecting a signal sequence having a lowest PAPR (Peak-to-Average Power Ratio) among the converted signal sequences, and transmitting the selected signal sequence, the transmitter apparatus comprising:

a single IFFT (Inverse Fast Fourier Transformer) for performing an Inverse Fast Fourier Transform process on the plurality of signals of the signal block, and generating a conversion sequence symbol having a plurality of samples;

a mask operator for receiving a plurality of mask coefficient groups for generating a plurality of signal sequences containing a signal sequence having a lowest PAPR, multiplying the plurality of samples by another received mask coefficient group among the received plurality of mask coefficient groups, whenever the plurality of samples generated from the IFFT are circulated, and generating a plurality of masking-processed sequences; and a selector for selecting a specific sequence having a lowest PAPR among the masking-processed sequences generated from the mask operator, and transmitting the selected sequence.

12. The apparatus as set forth in claim 11, wherein the mask operator further includes a shift register for storing the plurality of samples generated from the IFFT.

13. The apparatus as set forth in claim 12, wherein the shift register includes a plurality of memories serially connected to each other for storing individual samples, respectively.

14. The apparatus as set forth in claim 13, wherein the shift register acts as a cyclic shift register for connecting an output-terminal of a last memory among the plurality of memories to an input terminal of a first memory among the plurality of memories, such that a first input sample among the plurality of samples is applied to the first memory whenever it is generated from the last memory.

15. The apparatus as set forth in claim 11, wherein the mask operator further includes a plurality of multiplier groups, each including a plurality of multipliers, wherein the plurality of multipliers are each connected to output terminals of the plurality of memories, receive the plurality of mask coefficient groups, each including plurality of mask coefficients for generating a plurality of signal sequences including a signal sequence having a lowest PAPR, and multiply the plurality of samples by another received mask coefficient group among the received plurality of mask coefficient groups, whenever the plurality of samples of the shift register are circulated.

16. The apparatus as set forth in claim 11, wherein the mask operator further includes a plurality of adder groups, each having an adder for adding up output values of the plurality of multipliers contained in each of the plurality of multiplier groups.

17. The apparatus as set forth in claim 11, further comprising:
a channel encoder for performing a channel-encoding process on an information bit to be transmitted.

18. The apparatus as set forth in claim 17, further comprising:
a mapper for controlling the information bit generated from the channel encoder to be associated with a signal contained in a predetermined signal constellation.

19. A data transmission method for converting a signal block including a plurality of signals corresponding to a plurality of sub-carriers contained in a frequency domain for use in a transmitter of an OFDM (Orthogonal Frequency Division Multiplexing) communication system into a plurality of signal sequences contained in a time domain, selecting a signal sequence having a lowest PAPR (Peak-to-Average Power Ratio) among the converted signal sequences, and transmitting the selected signal sequence, the method comprising the steps of:
a) performing an Inverse Fast Fourier Transform (IFFT) process on the signals of the signal block, and generating a conversion sequence symbol having a plurality of samples;
b) receiving a plurality of mask coefficient groups for generating a plurality of signal sequences containing a signal sequence having a lowest PAPR, multiplying the plurality of samples by another received mask coefficient group among the received plurality of mask coefficient groups, whenever the plurality of samples generated from the IFFT are circulated, and generating a plurality of masking-processed sequences; and
c) selecting a specific sequence having a lowest PAPR among the plurality of masking-processed sequences, and transmitting the selected sequence.

20. The method as set forth in claim 19, further comprising the step of:
d) storing the plurality of samples generated by the IFFT process in a predetermined shift register, which includes a plurality of memories connected in series to each other.

21. The method as set forth in claim 20, wherein the shift register acts as a cyclic shift register for connecting an output terminal of a last memory among the plurality of memories to an input terminal of a first memory among the plurality of memories, such that a first input sample among the plurality of samples is applied to the first memory when it is generated from the last memory.

22. The method as set forth in claim 19, wherein the step (b) comprises the step of:
b1) connecting a plurality of multipliers to output terminals of plurality of memories, receiving the plurality of mask coefficient groups, each including a plurality of mask coefficients, for generating the plurality of signal sequences containing the signal sequence having the lowest PAPR, and multiplying the plurality of samples by another received mask coefficient group among the received plurality of mask coefficient groups, when the plurality of samples of the shift register are circulated.

23. The method as set forth in claim 19, wherein the step (b) further comprises the step of:
b2) adding up output values of multiplication processes of each of the plurality of mask coefficient groups.

* * * * *